(12) United States Patent
Brown

(10) Patent No.: US 6,846,046 B2
(45) Date of Patent: Jan. 25, 2005

(54) UNIVERSAL VEHICLE TIRE/WHEEL AND FLOOR SPRAY SHIELD KIT

(76) Inventor: Comer Brown, 5977 Chad Evert La., Boise, ID (US) 83714

( * ) Notice: Subject to any disclaimer, the term of this patent is extended or adjusted under 35 U.S.C. 154(b) by 0 days.

(21) Appl. No.: 10/341,642

(22) Filed: Jan. 13, 2003

(65) Prior Publication Data

US 2003/0137188 A1 Jul. 24, 2003

Related U.S. Application Data

(60) Provisional application No. 60/347,735, filed on Jan. 11, 2002.

(51) Int. Cl.[7] .............................. B60B 7/00; B05C 11/11; G09F 21/04
(52) U.S. Cl. .............................. 301/37.103; 301/37.104; 118/504; 40/587
(58) Field of Search ....................... 301/37.101, 37.103, 301/37.104, 37.106; 239/104, 288; 118/504; 40/587

(56) References Cited

U.S. PATENT DOCUMENTS

| | | | |
|---|---|---|---|
| 3,854,448 A | | 12/1974 | Kromanaker ............... 118/505 |
| 4,628,858 A | * | 12/1986 | King et al. ................. 118/504 |
| 4,787,331 A | * | 11/1988 | Jarvis ........................ 118/504 |
| 4,811,991 A | * | 3/1989 | Moreno et al. ........ 301/37.103 |
| 4,874,206 A | | 10/1989 | Sampson ................... 301/37 R |
| 5,419,945 A | * | 5/1995 | Lopez ........................ 428/178 |
| 5,423,599 A | * | 6/1995 | Sherod et al. ......... 301/37.103 |
| 5,524,972 A | * | 6/1996 | Cailor et al. ............. 301/37.42 |
| 5,785,389 A | * | 7/1998 | Bradford ................. 301/37.42 |
| 5,916,658 A | * | 6/1999 | Mohr .......................... 428/81 |
| 6,068,345 A | * | 5/2000 | Bressie ................... 301/37.103 |
| 6,425,639 B1 | * | 7/2002 | Getzelman ............. 301/37.103 |
| 6,457,780 B1 | * | 10/2002 | Ernst ..................... 301/37.103 |
| 6,485,106 B1 | * | 11/2002 | Hermansen et al. ... 301/37.103 |

* cited by examiner

Primary Examiner—Russell D. Stormer
Assistant Examiner—Jason R Bellinger
(74) Attorney, Agent, or Firm—Pedersen & Co., PLLC; Ken J. Pedersen; Barbara S. Pedersen

(57) ABSTRACT

A series of disposable spray shields may be used singularly or in combination to shield the tire, wheel, or the floor around the tire individually, or in combination, during a treatment of the tire or the wheel. By including more than one radius in portions of the outer edges of the tire and wheel shields, or by providing an adjustable tire-receiving opening in the floor shield, a single set of shields may fit many different tires, tire inflations, vehicles, and wheels. The preferred shields are made from materials that can be shaped, cut, embossed, stamped or milled to create these radiused edges and openings that, when properly positioned by the user, will prevent undesirable tire and wheel treatment materials, coatings and paints from contacting certain preselected surfaces.

21 Claims, 5 Drawing Sheets

US 6,846,046 B2

UNIVERSAL VEHICLE TIRE/WHEEL AND FLOOR SPRAY SHIELD KIT

This application claims priority of provisional application 60/347,735, filed on Jan. 11, 2002, entitled "Universal Vehicle Tire/Wheel and Floor Spray Shield Kit," which is incorporated herein by reference.

BACKGROUND OF THE INVENTION

1. Field of Invention

The invention relates to the shielding and protection of the surrounding tire, wheel and floor area adjacent to vehicle tires while spraying with assorted commercial liquids for tire or wheel preservation, maintenance, and beautification.

2. Related Art

There are several problems associated with spraying commercial washes, cleaners, dressings, coatings and protectorates on tires and/or wheels. Such treatment of tires can result in staining or other damage to the wheel and the floor. Such treatment of wheels can result in staining or other damage to the tire and the floor.

First, many vehicles have expensive wheels made from metals that can tarnish or corrode from certain chemicals that can be present in tire sprays. There can be a buildup of coatings over-time. This can result in losses in value or additional costs to reverse the problem. Secondly, many of the sprays, become a sealant when they dry. This can create problems by discoloring garage floors, driveways and other surfaces where spraying is done. This phenomenon is extremely difficult and costly to correct.

Spraying coatings on wheels to clean, coat or paint the wheels requires protection of the tire from over spray to prevent unsatisfactory results. While such over spray typically reaches the tire, it can also reach the floor, which again is extremely difficult and costly to correct.

SUMMARY OF THE INVENTION

The invention comprises one or more simple shields that can be used to protect a vehicle tire, wheel and/or ground/floor surface, to prevent staining or other damage during treatment of the tire or wheel by application of cleaners, dressings, coatings, protectorates, paints or other sprays. A combination of the preferred shields may be used to shield the combination of a tire and the floor, or the combination of a wheel and the floor, for an efficient and effective treatment operation. The shields are each preferably a generally flat, planar sheet having specially designed cut-outs, fold-outs, and/or perimeter edges that allow one set of the preferred shields to universally fit a wide variety of different tires and vehicles. This way, a single set of preferably-disposable shields may be sold in the marketplace, and may be adapted for use and/or positioned differently by the user on whatever vehicle and tire the user wishes.

The first shield is an irregularly-shaped disc designed to protect the wheel. The first shield outer perimeter edge is irregular, in that various sectors of the generally circular shield have different radii. In other words, this shield features a series of two or more broken radiuses that can accommodate a wide range of wheel diameter sizes. Each broken radius extends along a circumference plane of 180 degrees or less depending on the number of different radii. A convenient precut and pre-stamped fold-mark handhold in the center of the device may be included to allow for ease in positioning and turning the disc, so that the sector with the appropriate radius is held against the tire portion being sprayed, while applying the spray treatment solution to the tire portion. One of more surfaces of the first shield may include indicia, to provide ample space for instructions of use, primary advertising and co-marketing opportunities.

The second shield is designed to protect the ground-floor surface adjacent to and around the tire. This second shield is adapted to rest on the ground or floor on which the vehicle is parked, and to extend on or near to the ground/floor around preferably three sides of the tire being treated. The preferred second shield includes size adjustment to permit the shield to be adjusted to various tire sizes allowing the shield to slide around the tire, preferably with a close fit to the tire footprint, while the tire is mounted on the vehicle. A precut and pre-stamped fold-mark handhold in the center of the second shield may be included to permit easy installation, positioning and removal of the second shield. One of more surfaces of the second shield may include indicia to provide ample space for instructions of use, primary advertising and co-marketing opportunities.

The third shield feature is designed to protect the tire, for example, for operations in which the wheel is being treated with sprays that are not desirable on the tire. The third shield is preferably a generally circular disc having a series of select radius cutouts that will receive or substantially match specific wheel diameter sizes. The shield will cover the tire while the wheel is being coated, cleaned or painted.

These three invented shields may be used and/or marketed separately, collectively or in any combination. When the need is to protect the wheel, the wheel shield and floor shield will be used. When the tire is to be protected, the tire shield and floor shield will be used. Consequently, the shields may be packaged to sell as a master kit or packaged for a specific market need or targeted market.

DETAILED DESCRIPTION OF THE PREFERRED EMBODIMENTS

Referring to the Figures, there are shown several, but not the only, embodiments of the invented shield system. The preferred embodiment of this invention is shown in FIG. 1 through FIG. 5. Individuals in the consumer and professional markets will use the universal shields for protection of either the tire or wheel in conjunction with the floor shield to prevent over spray when applying special treatments, coatings or paints. Since the three universal shields are designed to protect and accommodate different sized wheels, tires, and contact space between tire and the ground surface and serve the needs of numerous consumer and industrial markets, the dimensions, sizes, shapes and materials may vary according to the needs of the specific end user and/or market. The low cost, disposable and recyclable shields will permit an easy solution with broad market appeal.

The preferred embodiments may be made, for example, from cellulose or other fibers, solids or composites in various forms, including cardboard and corrugated medium, hardboard, particle board, metals, plastic, vinyl, acrylic, fiberglass, composites and/or other types of flat, thin resilient materials that are structurally stable and may be precut, fold-marked, sized so that they are ready-to-use without any further preparation.

Figure 1:
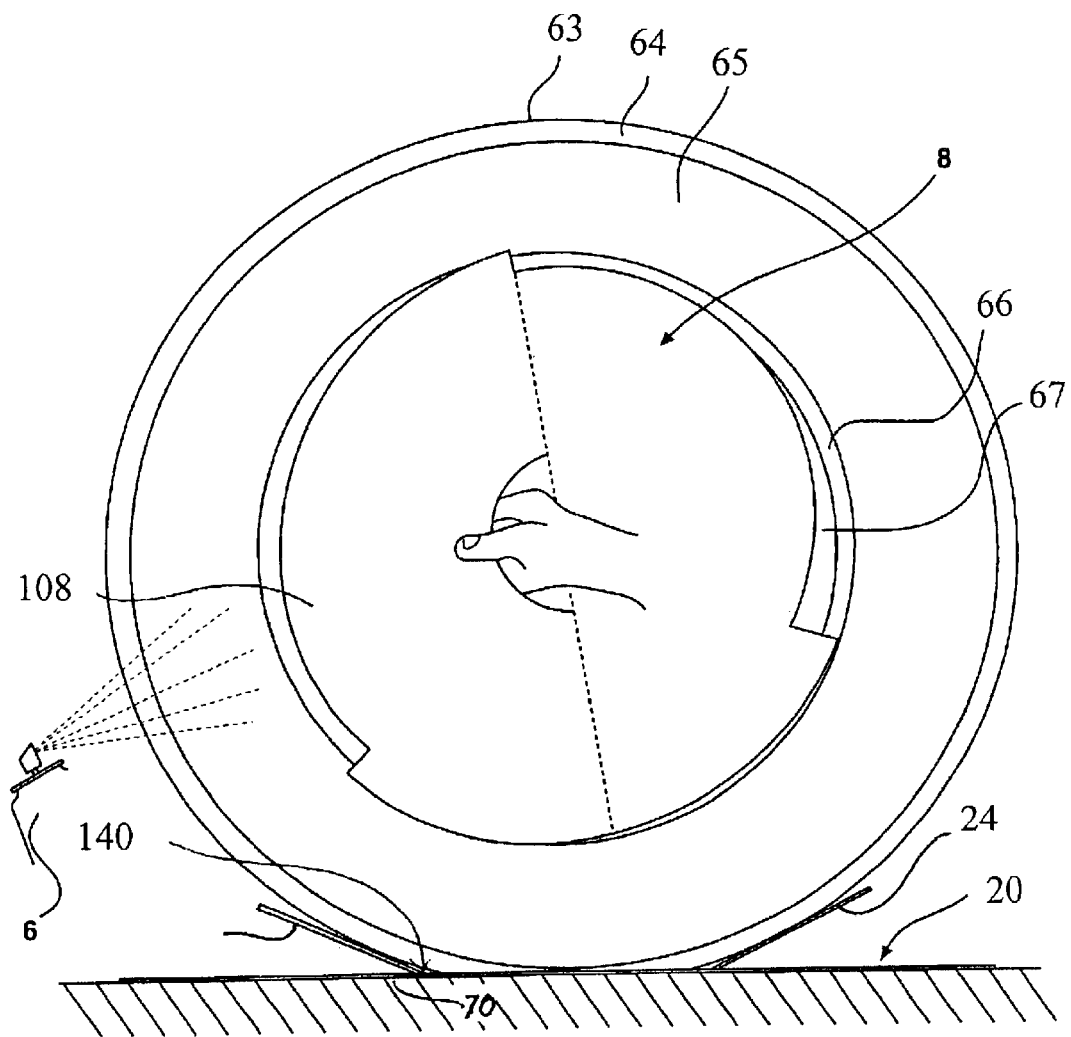
FIG. 1 is a side view of one embodiment of the invented Universal Floor Shield and one embodiment of the invented Universal Wheel Shield in place protecting the wheel and ground surface area while the tire is being treated.

FIG. 1 demonstrates the primary shape, profile, form and position for use of both the Universal Floor Spray Shield 20 and the Universal Wheel Spray Shield 8. The Universal Floor Spray Shield is adjusted to fit properly around the tire on the floor surface 70 and is installed around the tire as shown in FIG. 1. The correct or closest-matching radius of the wheel on the Universal Wheel Spray Shield is selected, and that sector of the Wheel Spray Shield is held against the wheel to cover the wheel especially in the area where spraying (6) is to be started. The Wheel Spray Shield is then rotated by hand around the circumference of the wheel, still with the appropriate sector being held against the wheel so that the wheel is covered, and the tire is uncovered, in the area being sprayed. This, therefore, provides protection from the tire spray while the treatment is in progress. For example, in FIG. 1, the "appropriate sector" with the "correct or closest-matching radius" is shown at call-out number 108. One may see, also from FIG. 1, that the other sectors, with other radii, do not fit that particular tire diameter as well as does sector 108, and so are not selected for use with that particular tire. The other sectors tend to either expose part of the wheel or cover part of the tire, making them less effective.

Figure 2:
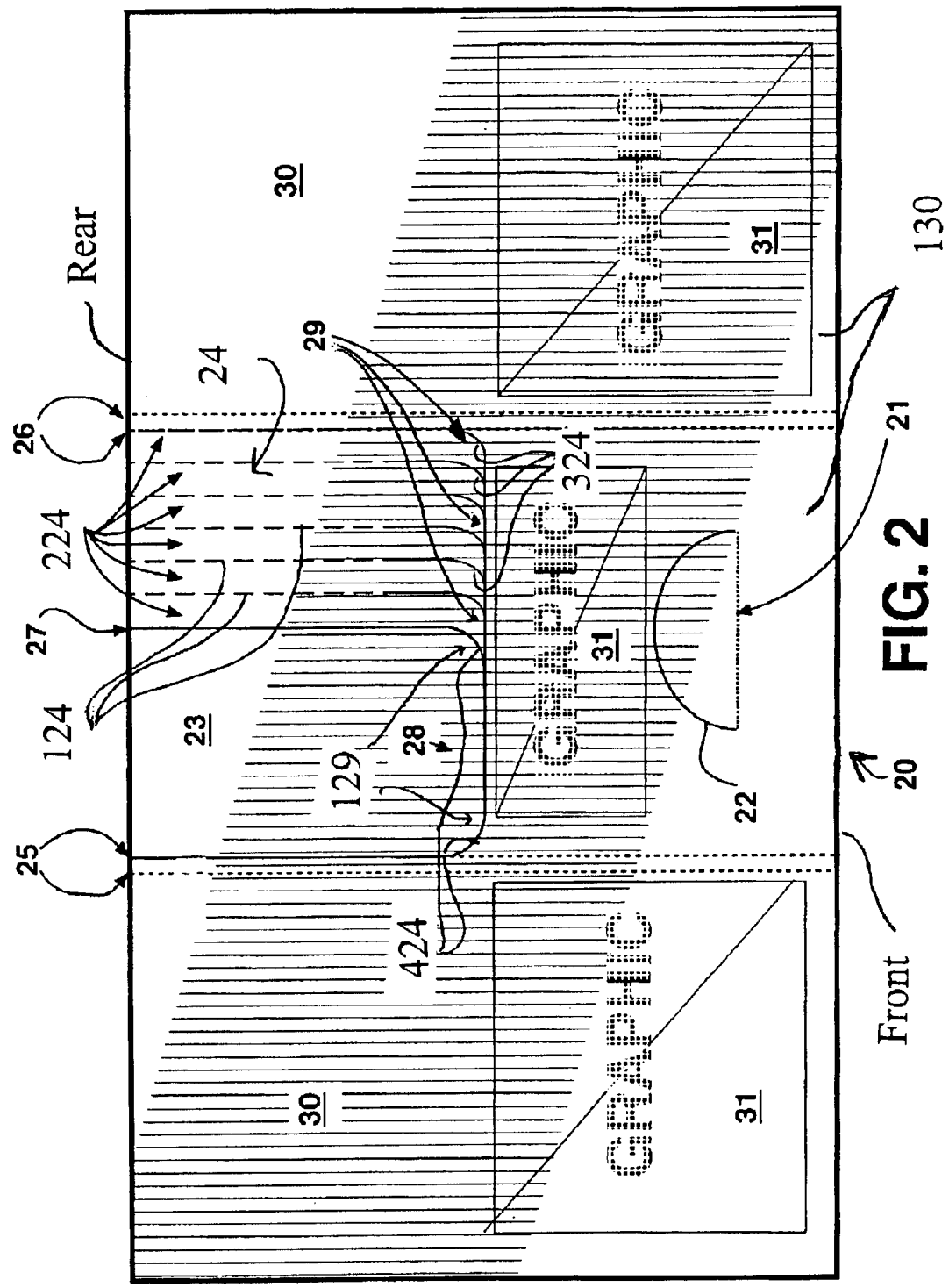
FIG. 2 is a top view of one embodiment of the Universal Floor Shield in a flattened position, showing one embodiment of the protection and size adjustment features prior to adjustment and folding for use.

FIG. 2 shows the various components of the preferred Universal Floor Shield 20. The main portion of the Floor Shield is typically used flat on the floor or ground around the tire to protect the floor, and comprises the over-spray areas 30, and the front apron 130. The preferred floor shield extends around at least two sides (at least one tread side and the front or outer side) of the tire. Most preferably, as shown in FIG. 2, the floor shield extends around three sides of the tire (both tread sides and the front or outer side of the tire).

The Floor Shield 20, in use, includes an opening 140 that receives the bottom of the tire, that is, the foot-print of the tire as it makes contact with the ground/floor. This opening 140 is preferably as close as possible to the footprint of the tire, wherein the footprint is generally a rectangular shape with somewhat rounded corners. In order to make the opening 140, and to make it adjustable so that the user may select the opening size to fit his/her particular tire and its particular footprint, the Floor Shield is provided with an adjustable opening system. This adjustable opening system includes two Adjustable Wings (Macro Adjustment Wing 23 and Micro Adjustable Wing 24) that permit universal use and versatility with any size tire/wheel combination. The Wings are separated by the Adjustment Wing Separator Die-cut 27. The left hand tire size Macro Adjustment Wing Die-cut 23 accepts certain small size tire/wheels. However, if adjustments need to be made to receive larger tires/wheels, the shield can be tailored to fit any size tire/wheel by merely selecting the appropriate Micro Adjustment Wing 24 position. In other words, the user separates wing 23 from the adjacent portion of wing 24 and folds wing 23 up out of the plane of the over-spray areas 30, and the front apron 130. The user selects the location at which to fold wing 24 up out of the plane of the over-spray areas 30, and the front apron 130 by selecting at which line 124 he/she will fold wing 24. For a small tire footprint, the user will not fold wing 24 up at all. For a slightly larger footprint, the user will fold wing 24 at the first line 124 to the right in FIG. 2 of the separator die-cut 27, or at the second or third line 124 to the right of the die-cut 27 for a larger footprint, etc. For the largest footprint, the user will fold wing 24 upwards at the farthest right line 124 in FIG. 4. Note that wing 23 preferably also has curved/rounded front corners 129 at its front edge, for forming curved opening corners 424. This way, if the opening is formed from one flap (23) being pivoted up out of the plane of the shield, the opening will still have the curved corners that fit well around the tire footprint.

Figure 4:
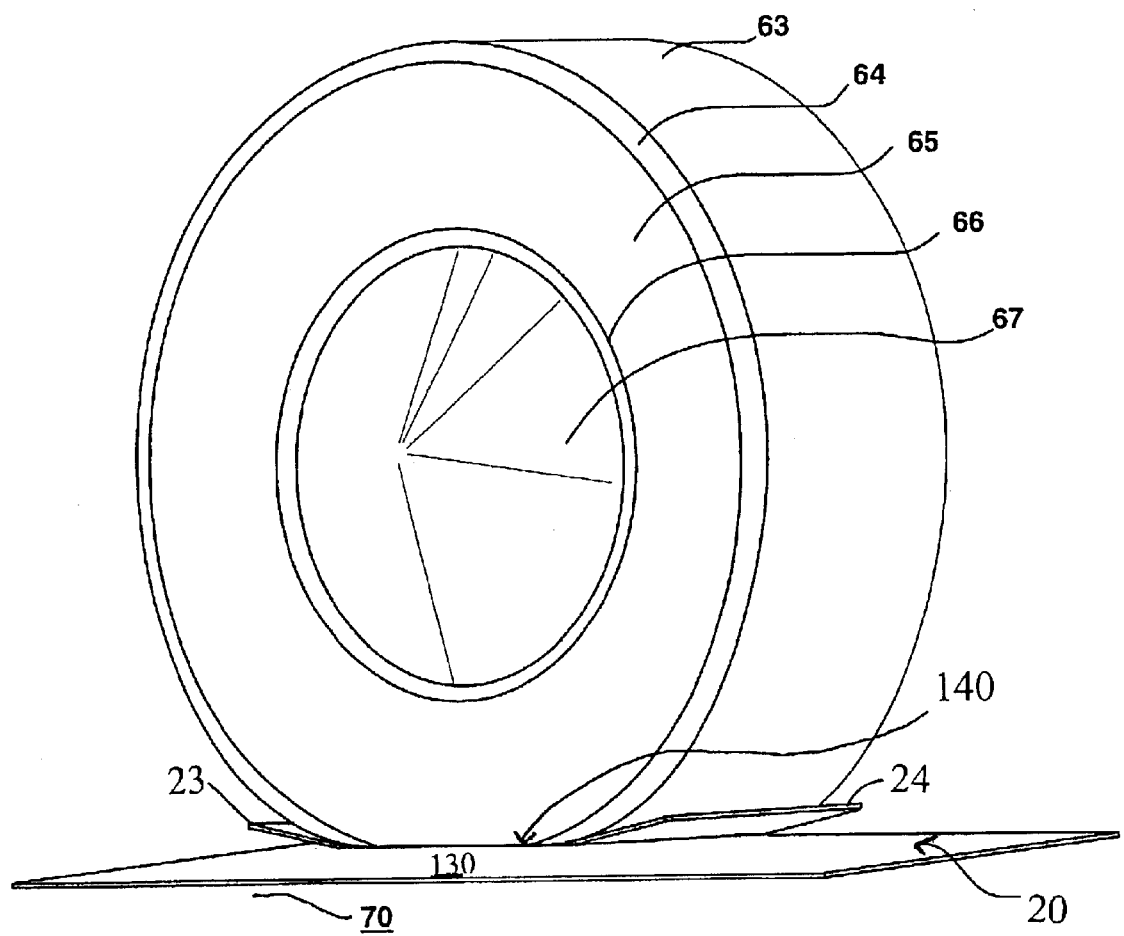
FIG. 4 is an angle view of an embodiment of the Universal Floor Shield in place around the bottom of a tire, prior to the Universal Wheel Shield or Universal Tire Shield being held in position in preparation for tire or wheel treatment.

FIG. 4 also illustrates a preferred adaptation that improves the shielding capabilities of the Floor Shield. This adaptation may be called the Curved Tire Footprint Micro Adjustment Wings 29 that are the inner ends of the each of the wing 24 portions 224. When a given one of the wing portions 224 is folded upward, the wing portion 224 separates from the adjacent portion 224 (to its right in FIG. 4) and leaves the flat portion of the shield with a curved edge 324. This curved edge 324 fits up closely to the tire in the "corner" of the tire footprint. This way the shield reaches closely adjacent to and preferably almost underneath the tire, so that no gaps in shielding of the floor are experienced. Otherwise, without the curved edge 324, there may be a generally triangular gap in shielding at the corners of the footprint through which spray can reach the floor. In other words, these Micro Adjustment Wings 29 are designed to wrap around the shape of the tire at the surface contact point.

In FIG. 4, only the Floor Shield 20 is being used, with the tire tread 63, tire edge 64, sidewall 65, and rim 66 exposed. Also, because no wheel shield 8 is being used in FIG. 4, the hub cap or wheel 67 is shown.

The convenient Hand Hold Die-cut 22 and Hand Hold Fold Embossed Crimp 21 creates a strong open hand hold area that permits easy ingress and egress for positioning the Floor Shield around the tire. Embossed/Crimped Packaging Fold Lines 25 and 26 are designed that the Shield 20 may be folded at two places transverse to its length. This reduces exposed shipping, merchandising and storage area by ⅓ and provides platform space for product attachment and marketing using shrink wrapping processes. The distance between the two lines in each set of two fold lines 25, 26 his provides space for nesting other Shield products in shipment or for merchandising purposes. Over-Spray Areas 30 are left open to provide surface protection space for over-spray on each side of the tire. The Graphic Placement Areas 31 provides space for advertising or promotion graphics by the seller and/or in conjunction with the buyer.

Figure 3:
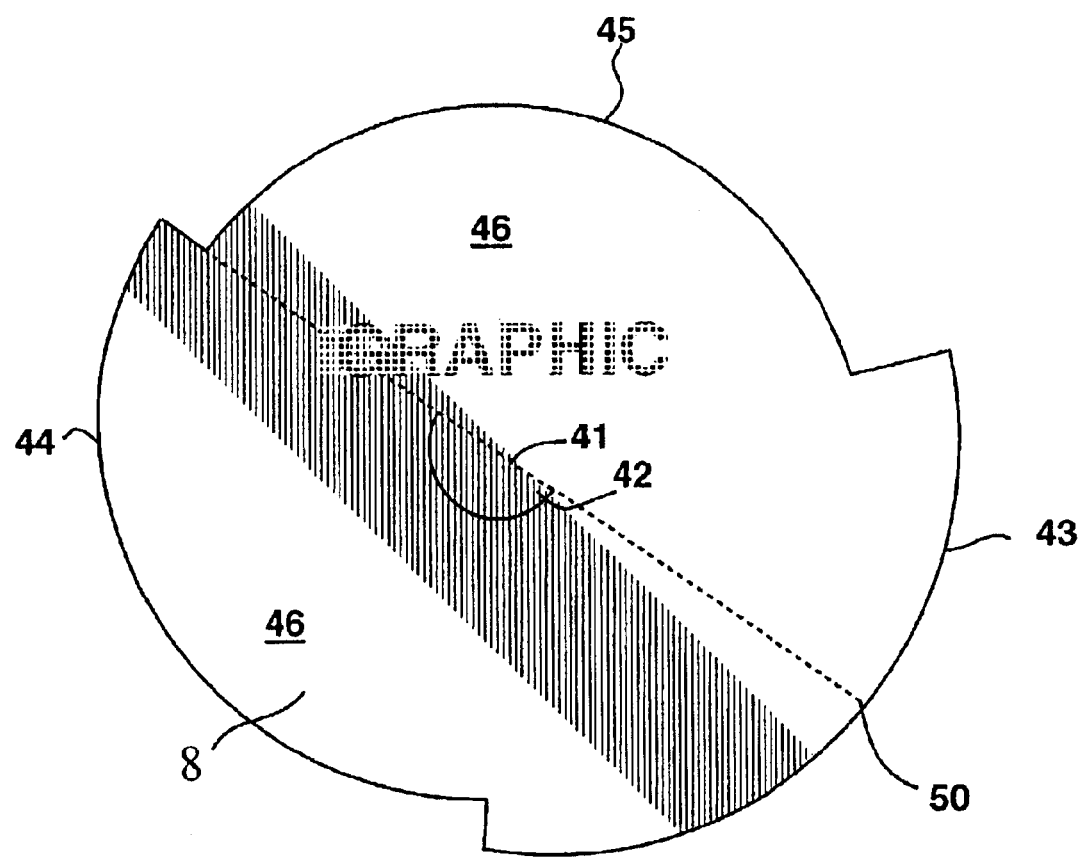
FIG. 3 is a top view of one embodiment of the invented Universal Wheel Shield configured for multiple wheel diameters, specifically, the Shield having three sectors with different radii.

FIG. 3 reflects the uniqueness of having multiple radiuses designed into a single wheel spray shield that will accommodate different size tires/wheels. The Universal Wheel Spray Shield in FIG. 3 shows that several broken radiuses can be included on a single plane by merely adjusting the radius measurements from center. The Universal Wheel Shield can be manufactured with a selection of assorted radiuses in any combination of tire/wheel sizes to satisfy the needs of the markets. The Hand Hold Die-cut 42 in Shield 8 makes it easy for the user to properly hold and rotate the shield in position around the perimeter of the wheel while the tire treatment is in progress. The Pre-stamped Embossed/Crimped Fold and Store Line 50 are provided to allow the shield to be folded to reduce storage, shipping and merchandising space.

FIG. 4 graphically shows the Universal Floor Spray Shield 20 indicating how the Tire Size Adjustment Wings 23, 24 fold out to fit any size tire/wheel. The wings can be fitted tightly by the user to prohibit any spray to come in contact with the ground or floor surface.

Figure 5:
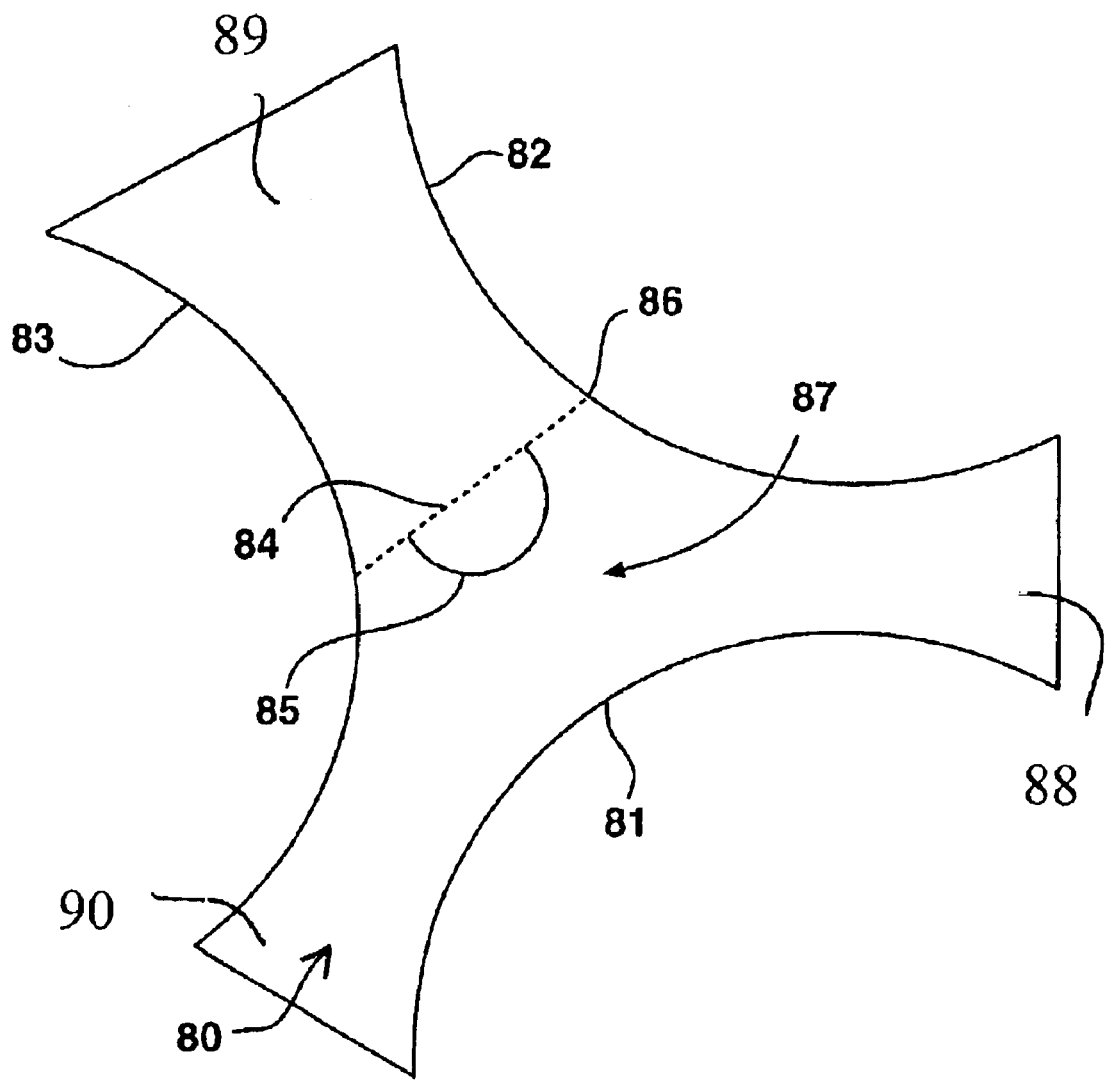
FIG. 5 is a top view of one embodiment of the invented Universal Tire Shield in a multiple size configuration having three different radii cut-outs, wherein the Tire Shield is ready for use by positioning the Tire Shield against various diameter tires.

FIG. 5 shows an example of the Universal Tire Spray Shield 80 with several shapes that correlate to multiple tire/wheel diameters. The Shield is held in place by hand over the tire to prohibit wheel treatments, coatings or paint to strike the tire surface. The preferred multiple cutouts 81, 82, 83 are of different radii, so that the correct/closest-matching one may be selected by the user for his/her wheel. The convenient Hand Hold Die-cut 85 permits the user to position and rotate the shield so that the appropriate (the selected) cutout 81, 82, 83 is moved around the perimeter of the wheel to most accurately and carefully protect the tire while the treatment is in progress. Again, the Shield 80 is adapted to protect the object being shielded (the tire) while not covering a portion of the object being treated (the wheel). The central portion 87 of the Shield 80 and also the spokes 88, 89, 90 serve at the shielding surfaces. The preferred Pre-stamped Embossed/Crimped Fold and Store Line 84 permits the shield to be folded to reduce storage, shipping and merchandising space by folding the Shield 80 roughly in half at position 86.

Preferably, all three shields 20, 8 and 80 may fold and nest together for convenience of storage, shipping and merchandising, with the wheel shield and the tire shield preferably being contained inside the folded floor shield. Two portions (31) of the floor shield may be printed with different indicia, for example, with advertising for two entities, such as the manufacturer and the retail store. This way, depending upon which side is folded to be outside, that indicia will show.

In the Description and the claims, the term "closely match" means that the radius of a sector of the shield is the same as that of the object it is shielding or at least within an acceptable tolerance, which in this field would be about 10 percent of the radius length. For example, therefore, if a radius to be matched were 7 inches, then "closely match" would mean that the radius of the shield would be 7 inches plus or minus about 0.7 inches. The term "substantially match" means that the tolerance may be somewhat less strict, for example, within about 20 percent, so that the tolerance on a 7 inch radius would be plus or minus about 1.4 inches. One may see that this would allow the manufacturer to make wheel and tire shields with three sectors/arms that will acceptably fit nearly all commercial tires within these guidelines. Specific examples of preferred radius and degrees of circumference for each sector are for three sizes as follows: may be a 120 degree circumference length for 17–18 inch wheels (radius average 8.75 inches), 120 degrees circumference length for 15–16 inch wheels (radius average 7.75 inches), and 120 degrees for 13–14 inch wheels (radius average 6.75 inches). Three similar selections (about 8.75 inch radius for 17–18 inch wheels, radius about 7.75 inches for 15–16 wheels, and about 6.75 inch radius for 13–14 wheels) may be made for a tire shield as in FIG. 5.

In the Description and the claims, "without gaps" between the tire and the floor shield at the opening means that there are preferably no gaps through which a significant amount of treatment material would spray when the sprayer is held at a reasonable angle to reach the tire surfaces. Certainly, there may be very small gaps due to unevenness of the tire and the floor or slightly imperfect fit of the shield, but "without gaps" means that there is preferably less than about 10 mm, and more preferably less than 5 mm, of gap at the curved corners of the opening of the floor shield.

Alternative shapes may be useful for the shields, especially for the floor shield, which need not necessarily be rectangular. A curved apron portion front edge could be used, for example.

Preferably, all three shields are generally flat and planar. This way, the rear sides (not shown) in the case of the wheel shield and tire shield may fit generally flat against the wheel and tire, and the bottom side (not shown) of the floor shield may fit generally flat against the floor. Protrusions from, or non-flat and non-planar surfaces on, the front surface (wheel and tire shields) and top surface (floor shield) may be acceptable for decorative, packaging, or display purposes, for example, but the preferred, flat embodiments are believed to be the most economical and practical.

A partial list of call-out references follows:

| FIGURE | No. | Description |
| --- | --- | --- |
| 1 | 63 | Tire Surface Tread. |
|  | 64 | Tire Side Tread. |
|  | 65 | Tire Side Wall. |
|  | 66 | Premium Wheel Rim Bead. |
|  | 67 | Premium Wheel Rim or Wheel Cover. |
|  | 6 | Tire treatment spray or solution. |
|  | 70 | Floor Surface |
|  | 8 | Wheel Spray Shield |
|  | 20 | Floor Spray Shield-Side View |
| 2 | 20 | Floor Shield-Top View |
|  | 21 | Hand Hold Fold Embossed/Crimp |
|  | 22 | Hand Hold Die-cut |
|  | 23 | Left Hand Tire Size Macro Adjustment Wing |
|  | 24 | Right Hand Tire Size Micro Adjustment Wings |
|  | 25 | Left Hand Tire Size Adjustment Wing Embossed/Crimp Packaging Fold Lines |
|  | 26 | Right Hand Tire Size Adjustment Wing Embossed/Crimp Packaging Fold Lines |
|  | 27 | Adjustment Wing Separator Die-cut |
|  | 28 | Adjustment Wing-Standard Tire Size Die-cut |
|  | 30 | Over-Spray Area |
|  | 31 | Graphic Placement Areas-For Instructions and Advertising |
|  | 32 | Pre-stamped Embossed/Crimped Fold and Store Line |
| 3 | 8 | Wheel Spray Shield-Top View |
|  | 41 | Hand Hold Fold Embossed/Crimp |
|  | 42 | Hand Hold Die-cut |
|  | 43 | 120 Degree Radius for 17–18 Inch Wheels |
|  | 44 | 120 Degree Radius for 15–16 Inch Wheels |
|  | 45 | 120 Degree Radius for 13–14 Inch Wheels |
|  | 46 | Graphic Placement Areas-Instructions and Advertising |
|  | 50 | Pre-Stamped Embossed/Crimped Fold and Store Line |
| 4 | 20 | Floor Shield-Angle View |
|  | 24 | Right Hand Tire Size Adjustment Wing |
|  | 23 | Left hand Tire Size Adjustment Wing |
|  | 63 | Tire Surface Tread |
|  | 64 | Tire Side Tread |
|  | 65 | Tire Side Wall |
|  | 66 | Premium Wheel Rim Bead |
|  | 67 | Premium Wheel Rim or Cover |
|  | 70 | Floor/Ground Surface |
| 5 | 80 | Tire Spray Shield-Top View* |
|  | 81 | Radius for 17–18 Inch Tires |
|  | 82 | Radius for 15–16 Inch Tires |
|  | 83 | Radius for 13–14 Inch Tires |
|  | 84 | Hand Hold Fold Embossed/Crimped |

-continued

| FIGURE | No. | Description |
|---|---|---|
| | 85 | Hand Hold Die-cut |
| | 86 | Pre-stamped Embossed/Crimped Fold and Store Line |
| | 87 | Tire Shield Graphic Area |

Although this invention has been described above with reference to particular means, materials and embodiments, it is to be understood that the invention is not limited to these disclosed particulars, but extends instead to all equivalents within the scope of the following claims.

I claim:

1. A shield system for use on a vehicle tire, the shield system comprising:
    a wheel shield for placement against a wheel or hubcap to shield the wheel or hubcap from spray being applied to the tire, the wheel shield being generally circular and comprising a plurality of circle sectors, each sector having a different radius from the other of said sectors so that each sector is adapted to fit a circumference of a differently-sized wheel.

2. A shield system as in claim 1 wherein the wheel shield includes three of said sectors.

3. A shield system as in claim 1 wherein the wheel shield further comprises a hand hold cut-out.

4. A shield system as in claim 1 wherein the wheel shield is generally planar.

5. A shield system as in claim 1 wherein the wheel shield is made of cardboard.

6. A shield system as in claim 1, further comprising a floor shield adapted for being placed on a floor around at least two sides of the tire being sprayed.

7. A shield system as in claim 6, wherein the floor shield is adapted for extending along three sides of the tire.

8. A shield system as in claim 6, wherein the floor shield comprises an opening at or near a rear edge of the floor shield adapted to receive a bottom portion of the tire.

9. A shield system as in claim 8, wherein said floor shield has a shielding portion on a plane for being placed flat on the floor, and has a first wing flap that is folded up from the plane of the shielding portion to form said opening.

10. A shield system for use on a vehicle tire being sprayed, the shield system comprising:
    a wheel shield for placement against a wheel or hubcap of a tire being sprayed and having an outer perimeter edge comprising a plurality of sections, each section of the outer perimeter edge being curved at a different radius from the other of said sections so that each section is adapted for fitting a circumference of a differently-sized wheel;
    a floor shield adapted for placement on a floor around at least two sides of the tire being sprayed, wherein the floor shield comprises an opening at or near a rear edge of the floor shield adapted to receive a bottom portion of the tire, a shielding portion on a plane for being placed flat on the floor, a first wing flap that is folded up from the plane of the shielding portion to form said opening, and a second wing flap near the opening and opposite the first wing flap, wherein said second wing flap is foldable up out of said plane to increase size of the opening.

11. A shield system as in claim 10, wherein said second wing flap has a plurality of wing portions separated by fold lines wherein said second wing flap is foldable at a plurality of said fold lines to adjust the size of the opening.

12. A shield system for use on a vehicle tire being sprayed, the shield system comprising:
    a wheel shield for placement against a wheel or hubcap of a tire being sprayed and having an outer perimeter edge comprising a plurality of sections, each section of the outer perimeter edge being curved at a different radius from the other of said sections so that each section is adapted for fitting a circumference of a differently-sized wheel;
    a floor shield adapted for placement on a floor around at least two sides of the tire being sprayed, wherein the floor shield comprises an opening at or near a rear edge of the floor shield adapted to receive a bottom portion of the tire, a shielding portion on a plane for being placed flat on the floor, and a first wing flap that is folded up from the plane of the shielding portion to form said opening, and wherein said first flap has a plurality of rounded edges so that said opening has two rounded corners at its front side for extending around the tire where the tire contacts the floor to minimize gaps between the tire and the floor shield.

13. A shield system as in claim 11, wherein said first flap and said second flap each have at least one rounded edge so that said opening has rounded corners at its front side for extending around the tire where the tire contacts the floor.

14. A shield system for use on a vehicle tire being sprayed, the shield system comprising:
    a wheel shield for placement against a wheel or hubcap of a tire being sprayed and having an outer perimeter edge comprising a plurality of sections, each section of the outer perimeter edge being curved at a different radius from the other of said sections so that each section is adapted for fitting a circumference of a differently-sized wheel; and
    a floor shield adapted for being placed on a floor around at least two sides of the tire being sprayed, wherein said floor shield has a hand hold cutout for use in positioning the floor shield around the tire.

15. A shield system as in claim 14, wherein the floor shield comprises a printable surface comprising indicia for advertising and instructions.

16. A shield system for use on a vehicle tire being sprayed, the shield system comprising:
    a wheel shield for placement against a wheel or hubcap of a tire being sprayed and having an outer perimeter edge comprising a plurality of sections, each section of the outer perimeter edge being curved at a different radius from the other of said sections so that each section is adapted for fitting a circumference of a differently-sized wheel;
    a floor shield adapted for being placed on a floor around at least two sides of the tire being sprayed; and
    a tire shield having an outer perimeter edge, and a plurality of scallops cut into said outer perimeter edge, wherein each of said scallops has a different radius adapted for matching a different wheel diameter.

17. A shield system as in claim 16, wherein said tire shield has three of said scallops, so that said tire shield comprises a central portion and three protruding arms radiating from said central portion.

18. A shield system for protecting a vehicle wheel and a floor or ground surface around a tire on the wheel from treatment materials during application of the spray of the treatment materials on the tire, the system comprising:

a wheel shield having a curved outer perimeter edge adapted so that at least a portion of the curved outer perimeter substantially matches a circumference of said wheel;

a floor shield having an apron portion adapted for placement on the floor or ground in front of the tire, and one or more over spray portions each adapted to extend from the apron portion around a tread side of the tire, wherein said floor shield has a plane and at least one flap that pivots out of the plane to create an opening at an edge of the shield adapted to receive the tire.

19. A shield system for protecting a vehicle wheel and a floor or ground surface around a tire on the wheel from treatment materials during application of the spray of the treatment materials on the tire, the system comprising:

a wheel shield having a curved outer perimeter edge adapted so that at least a portion of the curved outer perimeter substantially matches a circumference of said wheel;

a floor shield having an apron portion adapted for placement on the floor or ground in front of the tire, and one or more over spray portions each adapted to extend from the apron portion around a tread side of the tire, wherein said floor shield has two of said flaps opposite each other at the opening, and wherein one of said flaps is foldable to various sizes to adjust the length of the opening between the two flaps.

20. A vehicle tire and wheel treatment system comprising:

a wheel shield that is generally a circular disc and having an outer perimeter edge curved to substantially match the circumference of the wheel being treated; and a floor shield having a shield portion adapted for placement generally flat on the floor and an opening at a rear edge of the floor shield to receive the tire wherein the tire contacts the floor, wherein said opening is formed at least in part by a flap that pivots up from the floor shield at any of a plurality of parallel fold lines so that the flap may be adjusted in size to adjust the size of said opening.

21. A vehicle tire and wheel treatment system comprising:

a wheel shield that is generally a circular disc and having an outer perimeter edge curved to substantially match the circumference of the wheel being treated; and a floor shield having a shield portion adapted for placement generally flat on the floor and an opening at a rear edge of the floor shield to receive the tire wherein the tire contacts the floor, wherein said floor shield is generally rectangular with a generally rectangular opening, and wherein a flap that is liftable to form said opening has rounded corners so that the opening has rounded corners at its front edge to extend around the tire to near a footprint of the tire contacting the floor.

* * * * *